R. R. FROHOCK.
Garden-Fork.
No. 54,711. Patented May 15, 1866.
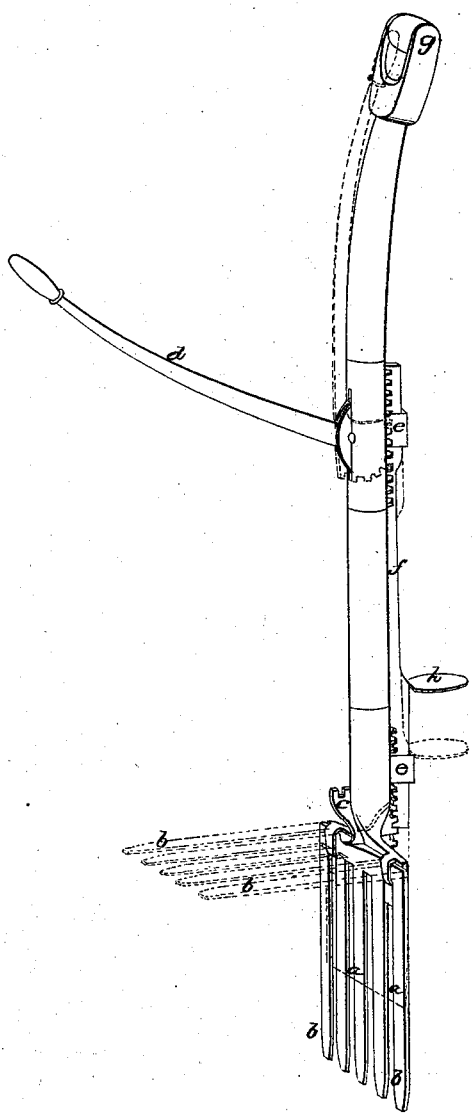

UNITED STATES PATENT OFFICE.

ROSCOE R. FROHOCK, OF BOSTON, MASSACHUSETTS.

IMPROVEMENT IN GARDEN-DIGGERS.

Specification forming part of Letters Patent No. 54,711, dated May 15, 1866.

*To all whom it may concern:*

Be it known that I, ROSCOE R. FROHOCK, of Boston, in the county of Suffolk and State of Massachusetts, have invented a new and Improved Garden-Digger; and I do hereby declare that the following, taken in connection with the drawing which accompanies and forms part of this specification, is a description of my invention sufficient to enable those skilled in the art to practice it.

This invention has for its object the lessening of the severe manual labor required in the work of spading the soil, whether the spading is performed for the purpose of lightening and turning over the soil or for the purpose of digging vegetable roots—potatoes, for example.

My invention consists in double blades, one of which may be made as a fork, when so arranged and combined with levers and other mechanism that while the two blades may in juxtaposition be forced together as one blade into the soil, the operator may at pleasure cause the front blade or fork to assume a position nearly at right angles to the rear blade, thus raising and elevating the soil in front of the digger, using the soil to the rear thereof to afford the resistance required.

The drawing shows, in perspective, an implement embodying my invention, the lines in black exhibiting all the parts in the position which they have when the digger is forced into the soil, and the lines in red showing the position assumed by the front blade under the action of the operator to lift the earth in front of the digger.

To a spade-handle is firmly fixed the rear blade, $a$, and pivoted thereunto and in front thereof is the front blade, $b$, which is shown as a broad-tined fork. Secured to this fork, and working through a mortise in the lower part of the handle, is a quadrant spur-gear, $c$, concentric with the pivots on which the fork $b$ turns. At about the middle of its length the handle $g$ is mortised and braced suitably with a metal sleeve around the mortise, so as to receive and pivot a lever, $d$, terminating in a quadrant spur-gear, similar to the quadrant $c$.

Fixed to the rear of the handle are sockets $e\ e$, in which slides a rod, $f$, having a rack on each end, the teeth of which mesh into the teeth of the quadrant-gears.

The handle $d$ being in the position shown in black lines, the digger is forced into the earth by the action of the foot of the operator in the same way as an ordinary spade; but the earth is raised, not as in operating by such a spade, but by the operator seizing the end of lever $d$ and drawing it toward the handle $g$, assisting this action, if necessary, by the pressure of the foot on the treadle $h$. The quadrant on lever $d$, meshing into the top rack of the rod $f$, pushes the rod $f$ down, and the teeth of the lower rack, meshing into the quadrant $c$, causes the fork $b$ to assume the position shown in red lines. This elevates the earth, which in falling off and through the tines or prongs of the fork becomes pulverized, bringing and leaving large bodies, like stones or potatoes, at the surface, from which they may be easily gathered. The digger is then withdrawn from its place and is inserted in the ground at the rear of its first position, about the distance of the ordinary spacing in common spading, and the operations before described are repeated.

By the use of this implement the severe strains occasioned in the use of the ordinary spade, by having constantly to bend the back and use one hand and arm as a fulcrum on which the earth is raised by employing the whole spade as a lever working on such fulcrum. In this implement the fulcrum on which the earth is raised is a part of itself, and the strain occasioned by lifting the soil is resisted by the firm earth at the rear.

In practice it has been found that more work can be done in a given time with my improved digger than can be accomplished with a common spade.

I claim—

A digging implement constructed with two blades, $a$ and $b$, arranged to operate together, substantially as described.

ROSCOE R. FROHOCK.

Witnesses:
 J. B. CROSBY,
 F. GOULD.